United States Patent [19]

Adams

[11] Patent Number: 6,044,396

[45] Date of Patent: Mar. 28, 2000

[54] METHOD AND APPARATUS FOR UTILIZING THE AVAILABLE BIT RATE IN A CONSTRAINED VARIABLE BIT RATE CHANNEL

[75] Inventor: Michael B. Adams, Castle Rock, Colo.

[73] Assignee: Time Warner Cable, a division of Time Warner Entertainment Company, L.P., Stamford, Conn.

[21] Appl. No.: 08/572,145

[22] Filed: Dec. 14, 1995

[51] Int. Cl.[7] ............................... H04N 7/14; H04N 7/12; H04H 1/02; H04J 3/02

[52] U.S. Cl. ............................. 709/217; 348/12; 348/13; 348/386; 348/387; 348/419; 348/423; 370/538; 455/5.1

[58] Field of Search ..................... 395/200.47, 200.48, 395/200.49; 348/6, 7, 12, 13, 723, 724, 384, 385, 386, 387, 390, 391, 423, 419; 455/3.1, 3.2, 4.1, 4.2, 5.1, 6.1; 370/537, 538, 540; 709/217–219

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |

(List continued on next page.)

OTHER PUBLICATIONS

Adams, Michael, "Network Design and Implementation of a large–scale, ATM, Multimedia Network," *Engineer Conference Notes* from NETWORLDsm+INTEROP® 95, Las Vegas, NV (Mar. 27–31, 1995).

Adams, Michael, "Real Time MPEG Assest Delivery over ATM," *NCTA Tecnical Papers, 1995*:15–326 (1995).

News Release, "Time Warner Introduces World's First Full Service Network in Orlando," TimeWarner Cable Full Service Network, Maitland, FL, 32751 (Dec. 14, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, Co.

Vecchi, Mario P., and Adams, Michael, "Traffic Management for Highly Interactive Transactional System," *NCTA Technical Papers*, 1995:258–266 (1995).

*Primary Examiner*—John W. Miller
*Attorney, Agent, or Firm*—Robert G. Crouch; Holland & Hart LLP

[57] ABSTRACT

A system for utilizing the available bit rate in a constrained variable bit rate channel is described. The system receives one or more encoded information streams, each having a variable bit rate. Rate control circuitry controls the rate of transmission of the encoded information streams so that the variable bit rate of the streams is transformed into a constrained variable bit rate, in which the variable bit rate is limited to a predetermined maximum value. A multiplexer multiplexes the encoded information streams for transmission over a channel. The channel may comprise a 6 MHz television channel. The multiplexer also multiplexes the encoded information streams with a secondary information stream for transmission over the channel. For purposes of multiplexer selection of information streams, the secondary information stream is assigned a lower priority than the encoded information streams. The encoded information streams may, for example, carry video data, whereas the secondary information stream may, for example, carry application data. The multiplexer may select from among the encoded information streams according to a round-robin scheme. The rate of the secondary information stream depends upon the rates of the encoded information streams. The rate of the secondary information stream may be controlled by a transmission control protocol, where the rate is adjusted by adjusting a transmit window of the protocol.

24 Claims, 5 Drawing Sheets

U.S. PATENT DOCUMENTS

| | | | |
|---|---|---|---|
| 4,553,161 | 11/1985 | Citta . | |
| 4,592,546 | 6/1986 | Fascenda et al. . | |
| 4,823,386 | 4/1989 | Dumbauld et al. . | |
| 4,991,208 | 2/1991 | Walker et al. . | |
| 5,046,090 | 9/1991 | Walker et al. . | |
| 5,093,718 | 3/1992 | Hoarty et al. . | |
| 5,168,353 | 12/1992 | Walker et al. . | |
| 5,220,420 | 6/1993 | Hoarty et al. . | |
| 5,225,267 | 7/1993 | Hansen et al. . | |
| 5,311,423 | 5/1994 | Clark . | |
| 5,343,239 | 8/1994 | Lappington et al. . | |
| 5,357,276 | 10/1994 | Banker et al. . | |
| 5,361,091 | 11/1994 | Hoarty et al. . | |
| 5,361,096 | 11/1994 | Ohki et al. | 348/387 |
| 5,383,112 | 1/1995 | Clark . | |
| 5,390,337 | 2/1995 | Jelinek et al. . | |
| 5,394,394 | 2/1995 | Crowther et al. . | |
| 5,400,402 | 3/1995 | Garfinkle . | |
| 5,412,720 | 5/1995 | Hoarty . | |
| 5,421,031 | 5/1995 | De Bey . | |
| 5,422,674 | 6/1995 | Hooper et al. . | |
| 5,423,555 | 6/1995 | Kidrin . | |
| 5,425,027 | 6/1995 | Baran . | |
| 5,426,699 | 6/1995 | Wunderlich et al. . | |
| 5,442,700 | 8/1995 | Snell et al. . | |
| 5,446,726 | 8/1995 | Rostoker et al. . | |
| 5,452,297 | 9/1995 | Hiller et al. . | |
| 5,453,979 | 9/1995 | Schibler et al. . | |
| 5,455,701 | 10/1995 | Eng et al. . | |
| 5,455,820 | 10/1995 | Yamada . | |
| 5,455,825 | 10/1995 | Lauer et al. . | |
| 5,459,722 | 10/1995 | Sherif . | |
| 5,563,648 | 10/1996 | Menand et al. | 348/13 |
| 5,650,860 | 7/1997 | Uz | 348/369 |
| 5,761,398 | 6/1998 | Legall | 348/409 X |
| 5,764,293 | 6/1998 | Uz et al. | 348/419 X |
| 5,771,316 | 6/1998 | Uz | 348/394 X |

METHOD AND APPARATUS FOR UTILIZING THE AVAILABLE BIT RATE IN A CONSTRAINED VARIABLE BIT RATE CHANNEL

BACKGROUND

With the advent of high-speed, high-bandwidth networking (e.g., transfer rates approaching one gigabit per second), "full-service" interactive television networks deliver a broad range of digital and analog services to a large number of user/customers. Some of these services include, for example, video-on-demand, home shopping, video games, and video conferencing, as well as the usual host of analog television programming.

These full-service networks typically include a central source location (called a "head end") that provides a stream of data and programming to subscribers. The head end itself usually comprises a bank of powerful servers connected to fast memory storage. The memory storage contains the data and applications requested by individual subscribers. As requests for data or programming are made, the head end services these requests by transporting the needed data and programming. The data and programming streams that enter into the subscriber's home are then processed by a "set-top processor" (also known as a set-top converter, home communications terminal (HCT), or the like).

In a traditional analog broadcast environment, the bandwidth is divided into multiple 6 MHz channels, each channel delivering its own program. In an interactive television system, programming, applications and data are not merely broadcast, but selectively transmitted to individuals or groups of users, who may themselves transmit information back to the head end. Consequently, bandwidth must be employed much more efficiently. To maximize efficiency, much of the information, including programming, is transmitted in digital form. In this format, one 6 MHz channel can be sliced into multiple "pipes" in a time division multiplexed manner, with each pipe carrying a different data stream.

Data may be transmitted over a network at a variable bit rate (VBR) by partitioning the data into a sequence of so-called "cells" and inputting them asynchronously into the network. One such network is the Broadband Integrated Services Digital Network (B-ISDN), which is referred to as an Asynchronous Transfer Mode (ATM) network. ATM networks allow video information to be transmitted with a variable bit rate. This, in turn, allows statistical multiplexing of data from a relatively large number of sources for transmission over a single data channel.

The ISO Moving Picture Experts Group (MPEG) audio-video coding standard provides a system multiplexing capability for communicating bit streams from several audio, video and/or auxiliary data sources. Examples of auxiliary data in a full service network are applications and their associated data, and control information. At a receiver, a system demultiplexer supplies audio packets, including at least one cell, to audio decoders, video packets, including at least one cell, to video decoders, and/or auxiliary packets, including at least one cell, to auxiliary decoders.

Without any bit rate adjustment, encoders tend to produce a variable bit rate output. The instantaneous bit rate at any time depends on the information to be transmitted, which, in turn, depends upon the detail within a video frame and the movement of images from frame-to-frame. Classic encoder technology, such as that manufactured by C-Cube of Milpitas, Calif., manipulates the encoder output using rate-controlled buffers to produce an encoder output having a constant bit rate (CBR). This transformation avoids overburdening the channel capacity. Under this scheme, constraining a relatively large burst of data to the requirements of a constant bit rate may result in some data cells or packets being discarded. However, compressed data is extremely sensitive to loss, with a maximum tolerable error on the order of $10^{-10}$ being required to avoid data errors noticeable to the viewer.

Conversely, when the quantity of information to be transmitted falls below the maximum CBR value, the conventional CBR encoder increases the encoder bit rate so that the bit rate remains at the constant maximum CBR limit. One technique for increasing the bit rate is to reduce the quantization step size, thereby enhancing picture quality. As a result, a scene that does not convey much information, such as a slow-moving scene with little detail, will be rendered with extremely high resolution. This is usually a waste of valuable bandwidth.

It is desired to find a way to take advantage of this heretofore wasted bandwidth, while at the same time maintaining reasonable video quality with an acceptable error rate.

SUMMARY OF THE INVENTION

The present invention provides a method and apparatus for utilizing the available bit rate in a constrained variable bit rate channel. The apparatus receives one or more encoded information streams, each having a variable bit rate. Rate control circuitry controls the rate of transmission of the encoded information streams so that the variable bit rate of the streams is transformed into a constrained variable bit rate, in which the variable bit rate is limited to a predetermined maximum value. A multiplexer multiplexes the encoded information streams for transmission over a channel. The channel may comprise a 6 MHz television channel. The multiplexer also multiplexes the encoded information streams with a secondary information stream for transmission over the channel. For purposes of multiplexer selection of information streams, the secondary information stream is assigned a lower priority than the encoded information streams. The encoded information streams may, for example, carry video data, whereas the secondary information stream may, for example, carry application data. The multiplexer may select from among the encoded information streams according to a round-robin scheme. The rate of the secondary information stream depends upon the rates of the encoded information streams. The rate of the secondary information stream may be controlled by a transmission control protocol, where the rate is adjusted by adjusting a transmit window of the protocol.

BRIEF DESCRIPTION OF THE DRAWINGS

The drawings set forth exemplary embodiments of the invention as follows.

DETAILED DESCRIPTION OF THE INVENTION

The present invention provides a method and apparatus for utilizing the available bit rate in a constrained variable bit rate channel. In the following description, numerous details are set forth for purposes of explanation. However, one of ordinary skill in the art will realize that the invention may be practiced without the use of these specific details. In other instances, well-known structures, process steps and the like are omitted in order not to obscure the description of the invention with unnecessary detail.

Figure 1:
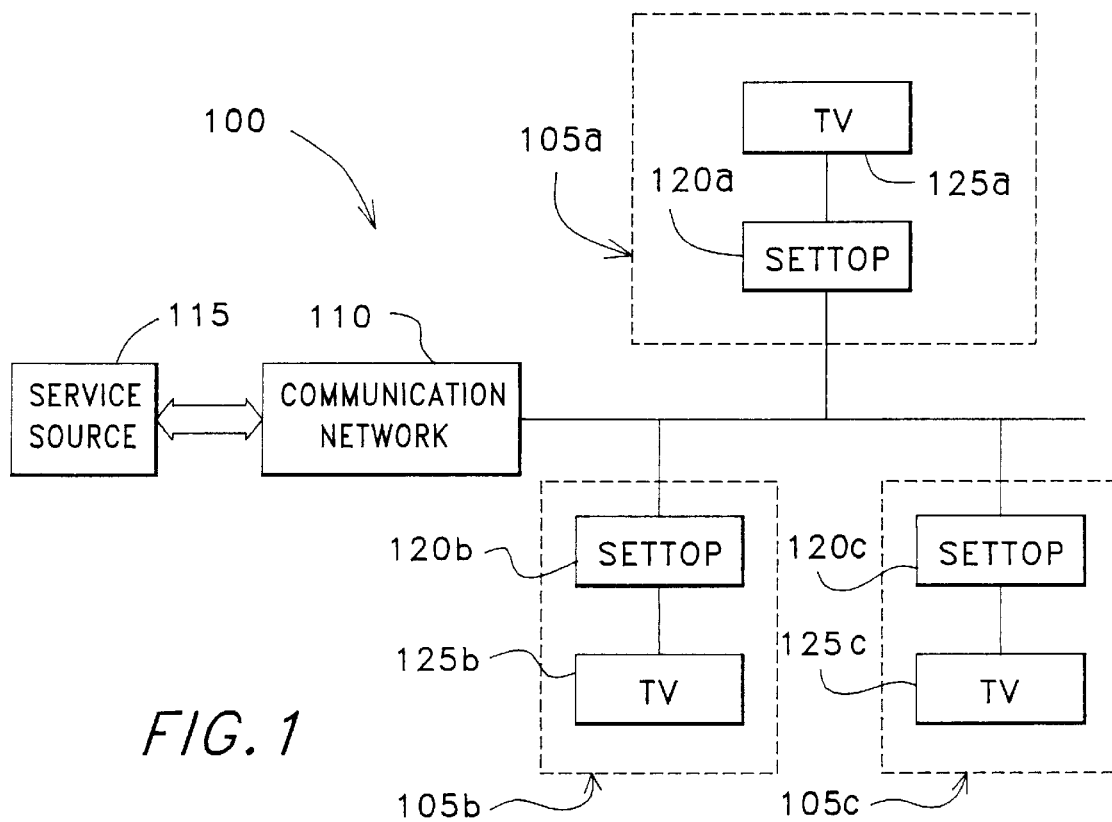
FIG. 1 illustrates an interactive communication system which may incorporate the invention.

FIG. 1 presents an interactive communication system 100 which may incorporate the invention. An example of such a network is the Time Warner Full Service Network operating in Orlando, Fla. This system includes a number of home terminal nodes 105, a communication network 110, and a service source 115. As shown in FIG. 1, each home terminal node 105 includes a set-top 120 and a television 125. Each set-top controls the operation of its corresponding television. In addition, through the communication network 110, a set-top (1) establishes a communication link between the television viewer and the service source, (2) presents selectable programming options provided by the service source to the viewer, and (3) relays program selections and commands from the viewer to the service source.

Figure 2:
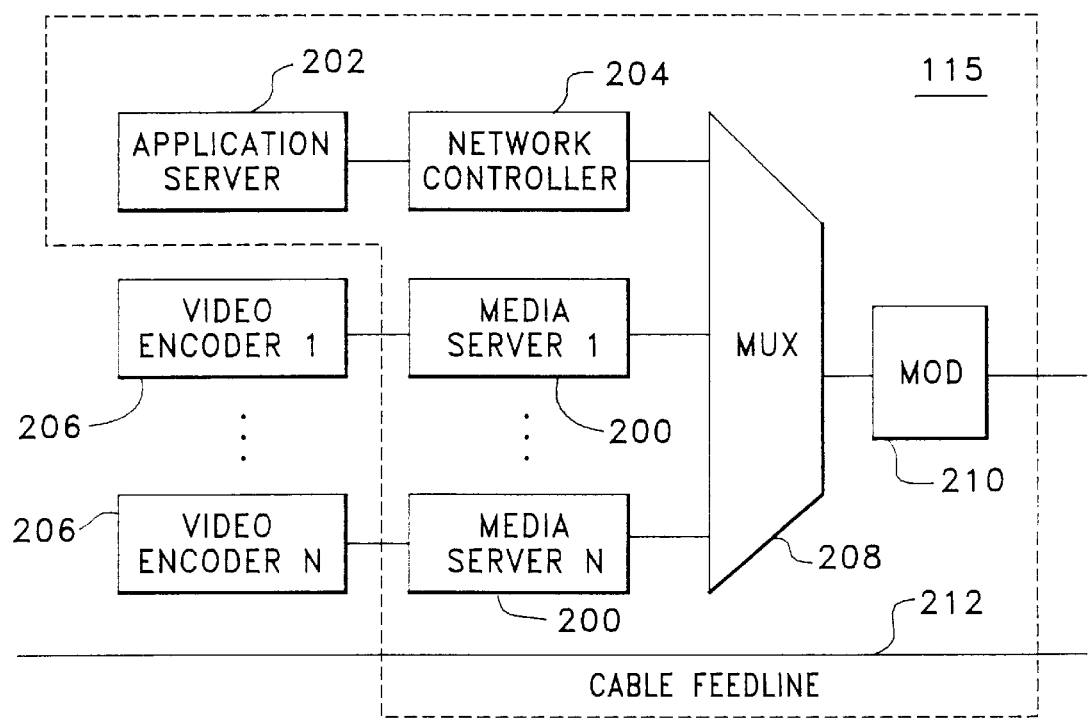
FIG. 2 illustrates an example of a service source used in the interactive communication system of FIG. 1.

FIG. 2 presents an example of a service source used in the interactive communication system of FIG. 1. As shown in FIG. 2, one example of the service source 115 includes a number of media servers 200, and at least one application server 202 coupled to a network controller 204. As an example, the application data can be stored and transmitted in Internet Protocol (IP) format, although those skilled in the art will recognize that other formats may be utilized. Each server 200 and 202 is also coupled to a data vault (not shown), such as an optical disk, for storing program content and/or application programs and data. The servers provide a variety of interactive digital services to the subscribers of the system. The servers retrieve stored digital media from the vaults and implement other commands in response to requests from the home terminal nodes.

According to the present invention, the data used by each media server is encoded in nonreal time by a video encoder 206. The encoded data is stored in the data vaults (not shown) associated with the media servers 200, so that the servers 200 can access the encoded data at a later time. FIG. 2 illustrates one encoder 206 per server 200, although those skilled in the art will recognize that only one encoder 206 is necessary to encode the data for all servers 200.

The outputs of the media servers 200 and the application server 202, through the network controller 204, are fed into a statistical multiplexer 208. The multiplexer 208 selects the packets or ATM cells to be forwarded to a modulator 210. The modulator 210, e.g., a QAM modulator, modulates the multiplexer output for transmission over a channel in the network 110.

The retrieved digital program (or application to be downloaded) can be transmitted to the set-top 120 through a shared channel or a dedicated channel. A shared channel is used to transmit data to a number of subscribers, while a dedicated channel is used to transmit data to a specific user of the network 110. As further shown in FIG. 2, the service source also has a cable feedline 212, which receives analog cable programming from a local cable company and supplies this programming to the network. The network then broadcasts the cable programming to all of the system's subscribers on shared bandwidths.

Figure 3:
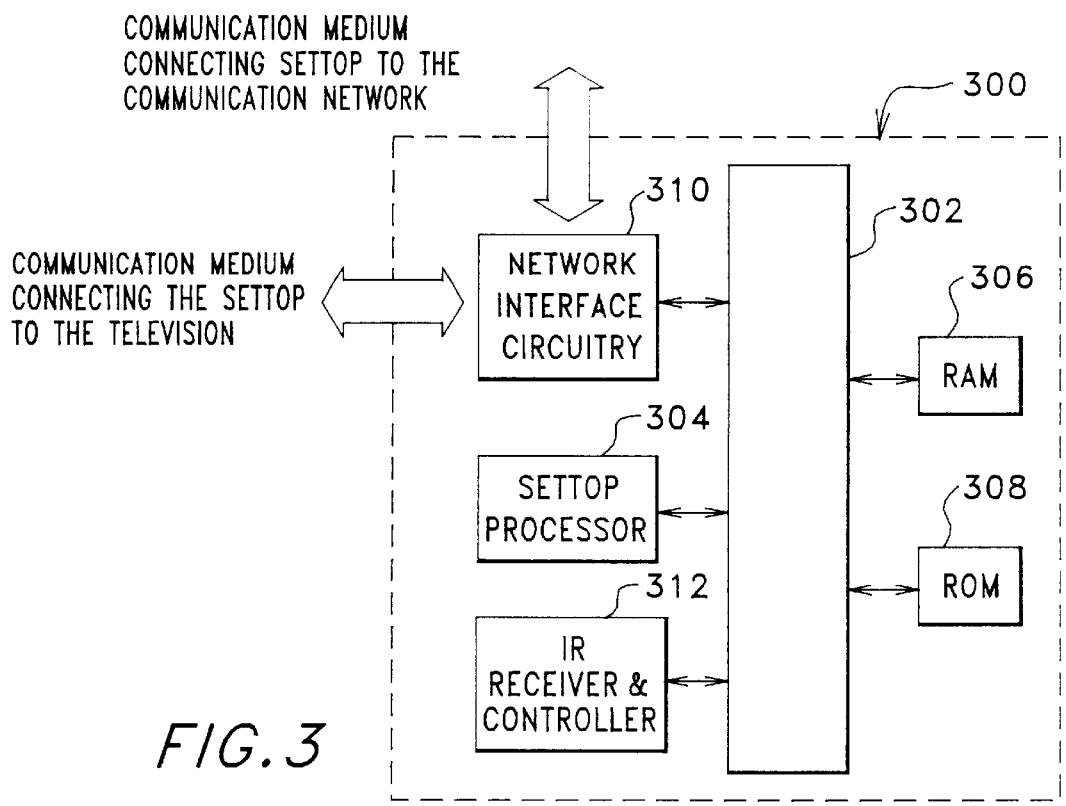
FIG. 3 illustrates a set-top employed by the invention.

FIG. 3 presents a home terminal set-top 300 used by the invention. The set-top 300 includes an internal bus 302, a processor 304, a random access memory (RAM) 306, a read-only memory (ROM) 308, a network interface 310, and an infra-red (IR) controller 312. The bus 302 represents the collective communication interface between the numerous internal modules of the set-top 300. In addition, this set-top uses processor 304 for processing digital signals, thereby controlling the operation of the set-top. Processor 304 is directed by the firmware and software instructions that respectively reside in ROM 308 and RAM 306. Moreover, the set-top 300 also uses RAM 306 to store temporary variables or other intermediate information during the operation of the processor.

As further shown in FIG. 3, the network interface 310 represents the interface circuitry utilized by set-top 300 for communicating to the network or the television through external communication media (such as coax cables). Finally, the set-top 300 includes IR controller 312 for receiving and decoding communications from a remote control (not shown) operated by the viewer.

Figure 4:
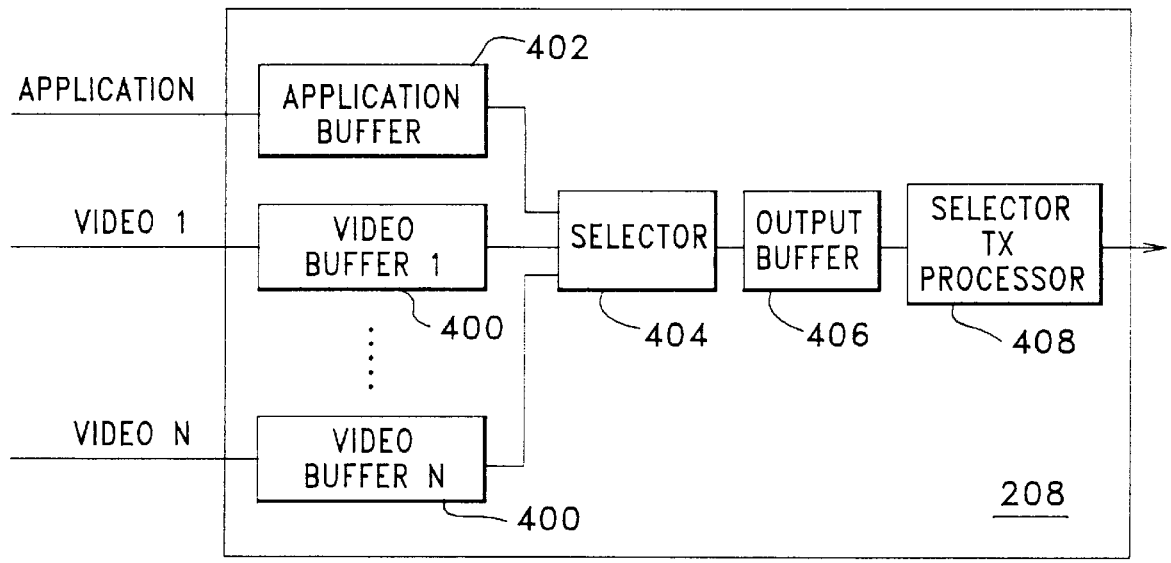
FIG. 4 illustrates an embodiment of a statistical multiplexer of the invention.

FIG. 4 illustrates one embodiment of the statistical multiplexer 208 of the present invention. The multiplexer 208 includes a number of video buffers 400 for receiving encoded video streams from the media servers 200 and at least one application buffer 402 for receiving the application data stream from the network controller 204. The buffers 400 and 402 may be implemented as first-in, first-out (FIFO) buffers. The buffer outputs are fed into a selector circuit 404, which may be implemented as an application specific integrated circuit (ASIC) or other logic. The selector selects one of the buffer outputs for transmission to an output buffer 406, which may also be implemented as a FIFO. A selector transmit processor 408 reads data from the output buffer for modulation onto a channel and transmission over the network 110. The data stored in each buffer slot is preferably in the form of an MPEG-2 transport packet. The transmit processor 408 may also be implemented as an ASIC or other logic.

The selector 404 of the present invention decides which data stream is to be given access to a channel of the network 110. Because of the real time constraints on the display of video data, the video streams must be given higher priority than the application data. If a video packet is lost or delayed, such an error will cause a noticeable effect on the video display. In contrast, the application or control information transmitted is typically not as sensitive to packet delay or loss. Accordingly, the selector 404 allocates the application data stream to a low priority access to the network. In accordance with this priority allocation, the selector selects the data stream to be forwarded to the network 110 according to the state diagram of FIG. 5.

Figure 5:
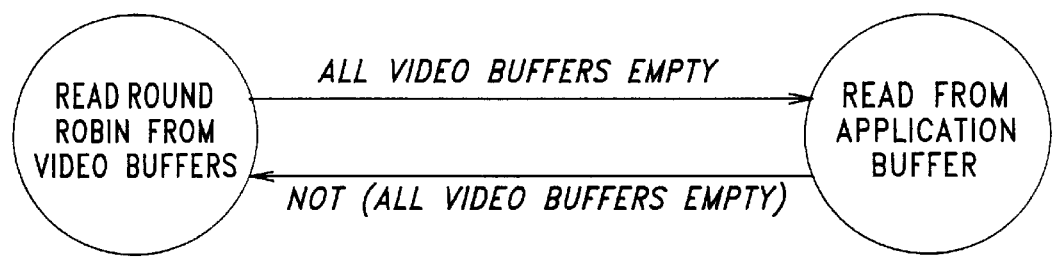
FIG. 5 is a state diagram illustrating the operation of the selector of the statistical multiplexer of FIG. 4.

As shown in FIG. 5, the selector 404 selects data from the video buffers 400 in a conventional round-robin fashion to ensure fair allocation to the network 110. This scheme precludes one video stream from preventing others from meeting the real time constraints of the video display. If and when all video buffers 400 are empty, the selector 404 passes data from the application buffer 402 to the output buffer 406. The selector 404 will continue reading from the application buffer 402 until data is detected in one or more of the video buffers 400. At that time, the selector 404 will again read from the video buffers 400 in a round-robin fashion.

Figure 6:
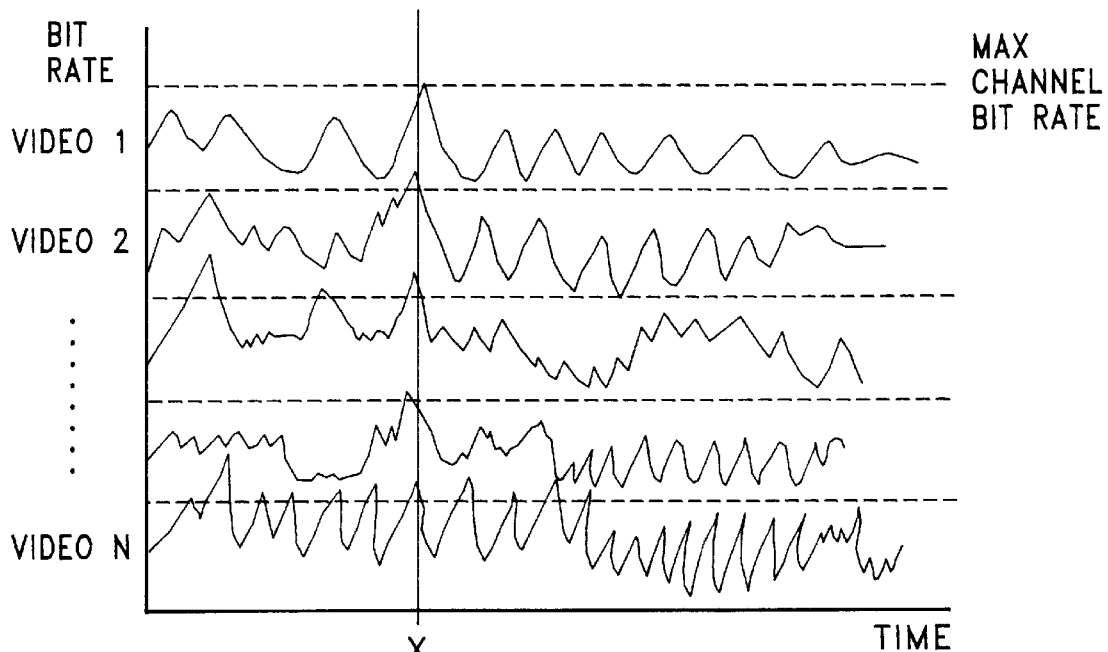
FIG. 6 illustrates an example of a channel occupancy diagram for variable bit rate program streams.

FIG. 6 illustrates one example of a channel occupancy diagram for a 6 MHz analog television channel. In the example of FIG. 6, N video streams are multiplexed in asynchronous transfer mode onto the channel according to conventional techniques. These video streams have a variable bit rate as a result of standard MPEG-2 encoding. However, the maximum allowable bit rate for the 6 MHz channel is on the order of 27 or 36 million bits per second (Mbps). It can be seen that at some points in time, such as point X, the sum of the instantaneous bit rates of the individual video streams will exceed the maximum bit rate of the 6 MHz channel. As mentioned above, conventional systems avoid this problem by transforming the VBR signals into constant bit rate (CBR) signals. Under this scheme, the bit rate C for each video stream is set to a value of approximately 1.5–9.0 Mbps, where the number of video streams multiplexed onto the 6 MHz channel is on the order of N=6–10. However, the CBR transformation wastes bit rate by increasing picture quality where a higher resolution is unnecessary.

Figure 7:
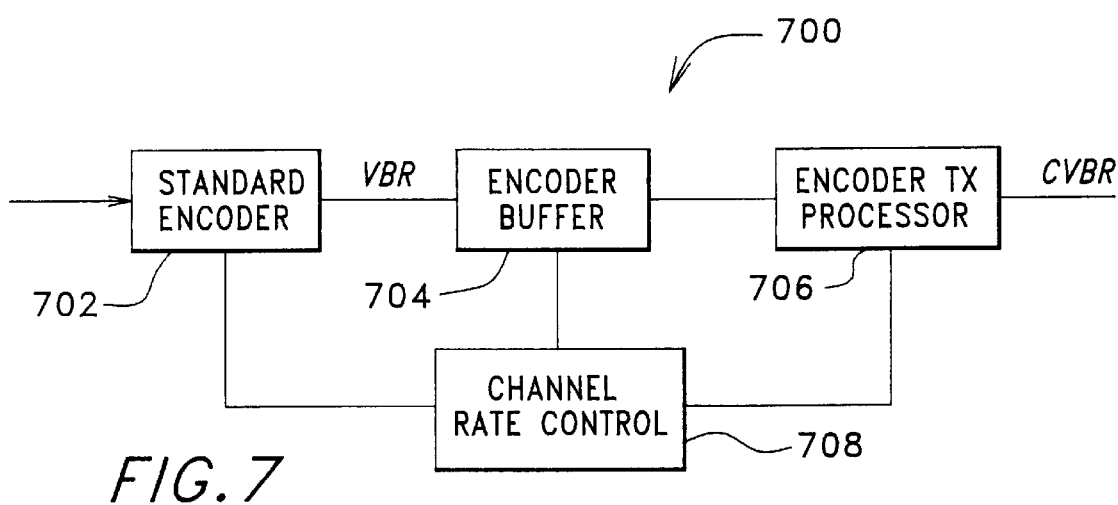
FIG. 7 illustrates an embodiment of a constrained variable bit rate encoder according to the invention.

The present invention avoids this waste of bit rate, and at the same time utilizes the now available bit rate to transmit more data over the network 110. FIG. 7 illustrates an embodiment of a constrained variable bit rate (CVBR) encoder 700 according to the present invention. The CVBR encoder is illustrated for one video stream input to the selector 404 by a media server 200. The CVBR encoder 700 includes a standard encoder 702 (such as an MPEG encoder), an encoder buffer 704, an encoder transmit processor 706, and a channel rate control circuit 708. The encoder transmit processor 706 and the channel rate control circuit 708 may be implemented as ASICs or other similar logic. The standard encoder 702 outputs compressed data at a variable bit rate. The compressed data is stored in the encoder buffer 704, which may be implemented as a FIFO. The encoder transmit processor 706 forwards packets of the data from the encoder buffer 704 to memory (not shown) for storage and later transmission over the network by a media server 200. The channel rate control circuit 708 monitors the fullness of the encoder buffer 704, and, in response, controls the processing rate of the encoder 202 and the encoder transmit processor 706.

Figure 8:
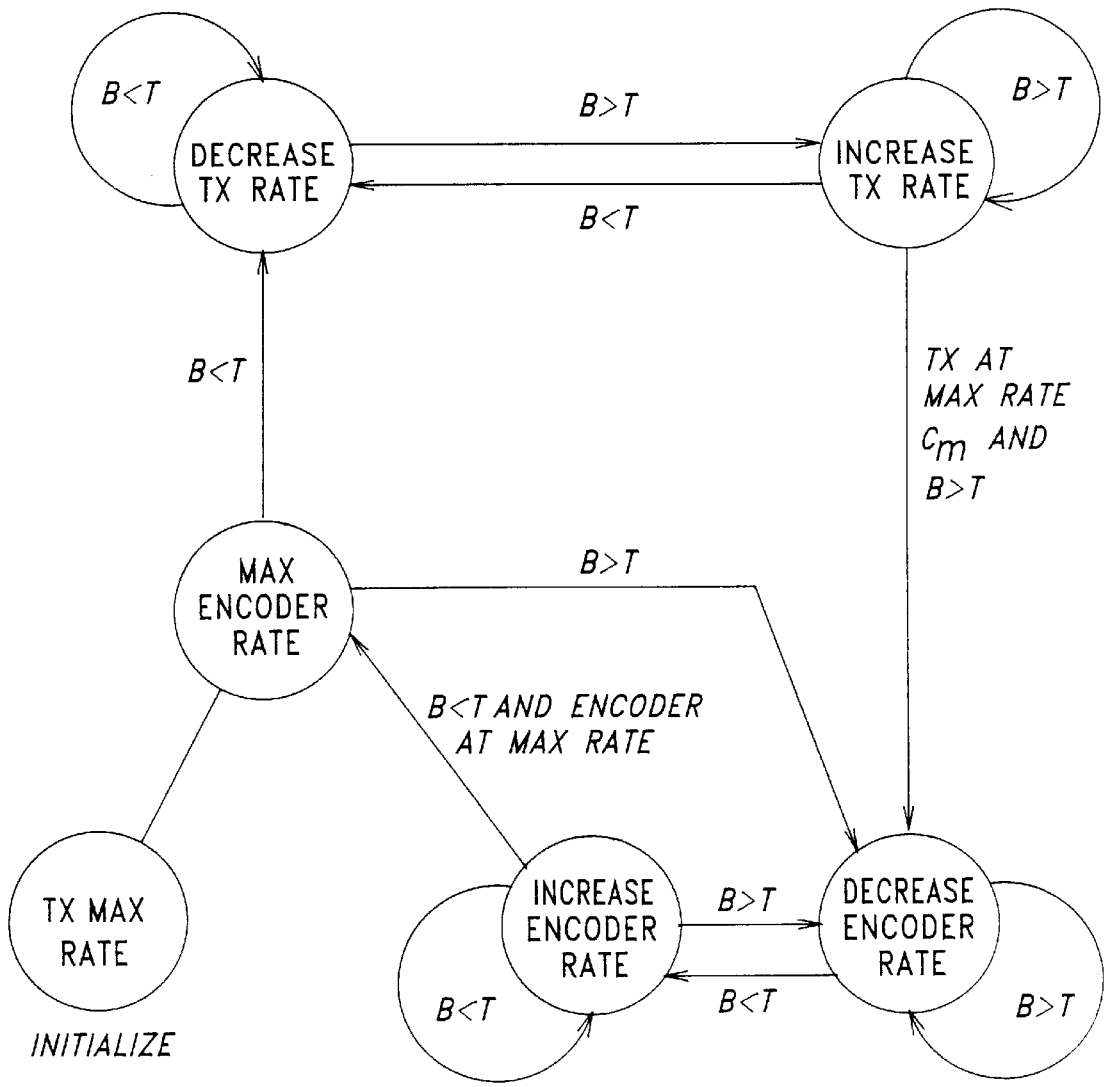
FIG. 8 is a state diagram illustrating the operation of a channel rate control circuit of the encoder of FIG. 7.

The channel rate control circuit 708, in one embodiment, operates according to the state diagram of FIG. 8. The channel rate control circuit 708 initializes the encoder 702 and the encoder transmit processor 706 to operate at their maximum rates. One way to achieve maximum encoder rate is to select the smallest quantization step size for the encoder 702. The channel rate control circuit 708 governs rates of the encoder 702 and the encoder transmit processor 706 based upon a comparison of buffer 704 fullness B with a buffer fullness threshold T. T may be chosen arbitrarily, as 0.5, for example, indicating that the buffer is 50% full. If B<T, then the channel rate control circuit 708 instructs the encoder transmit processor 706 to decrease the rate at which the transmit processor 706 reads data from the encoder buffer 704. If the buffer 704 still remains relatively empty, as indicated by B<T, then the channel rate control circuit 708 instructs the encoder transmit processor 706 to again decrease its rate. Thus, it can be seen that if the encoder 702 is not filling the encoder buffer 704 at a rapid rate, then the encoder transmit processor 706 will not attempt to write data from the encoder buffer 704 into memory at a rapid rate.

The transmit processor 706 will continue to decrease its rate until the buffer 704 fills to the point that B>T, at which time the channel rate control circuit 708 will instruct the transmit processor 706 to increase the rate at which it reads data from the encoder buffer 704. This rate will continue to increase if the buffer 704 continues to remain relatively full, as indicated by B>T. If buffer fullness should begin to fall below the threshold, as indicated by B<F, then the rate will again decrease.

If, however, the buffer 704 remains relatively full, as indicated by B>T, even after the encoder transmit processor 706 rate has been increased to a predetermined maximum rate $C_m$, then the channel rate control circuit 708 will instruct the encoder 702 to decrease the rate at which it outputs compressed data. This action will prevent an encoder buffer overflow. The encoder 702 rate can be decreased by increasing the quantization step size. Other methods for varying the encoder rate are well known in the art, such as decreasing the image resolution through subsampling or decreasing the number of I frames.

If the buffer 704 continues to remain relatively full, as indicated by B>T, then the channel rate control circuit 708 will continue to instruct the encoder 702 to decrease its output rate. If the encoder rate continues to decrease, then at some point the quality of the encoded video signal will become unacceptable to the viewer. If this occurs, then the system designer may wish to raise the maximum encoder transmit processor 706 rate $C_m$. If, however, the buffer 704 becomes relatively empty, as indicated by B<T, then the channel rate control circuit 708 will instruct the encoder 702 to increase the output rate. If, in this state, the buffer becomes relatively full, as indicated by B>T, then the encoder rate will be decreased again. If the buffer 704 still remains relatively empty, the rate control circuit 708 will continue to instruct the encoder to increase its rate until it reaches the maximum encoder rate. At that point, if the buffer 704 still remains relatively empty (B<T), then the rate control circuit 708 will instruct the encoder transmit processor 706 to decrease its rate.

Figure 9:
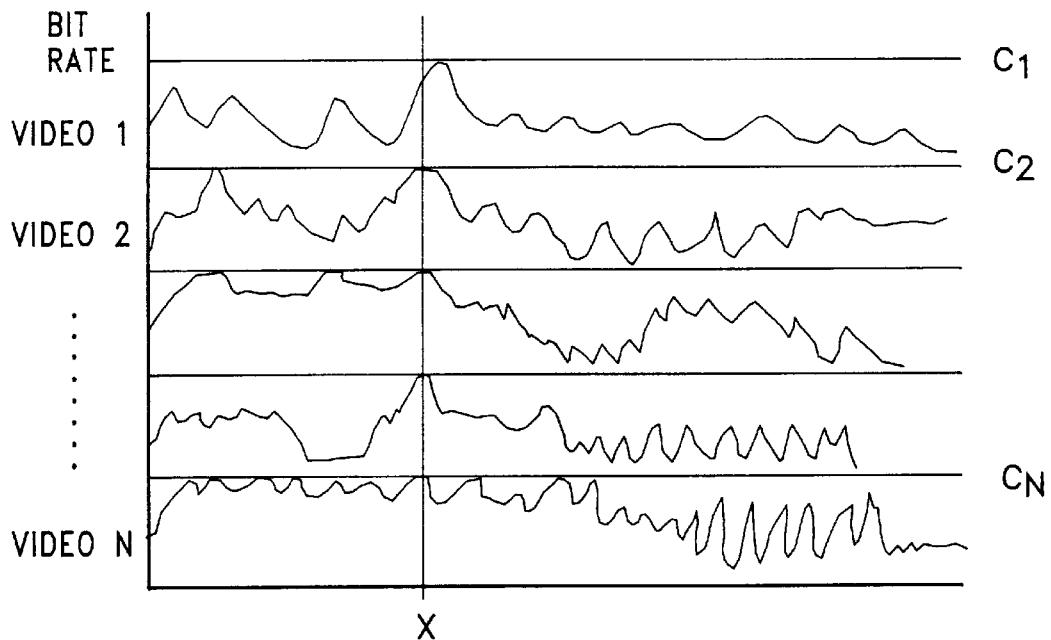
FIG. 9 is an example of a channel occupancy diagram according to the present invention.

It can be seen that by controlling the rates of the encoder 702 and the encoder transmit processor 706 in this manner, the bit rate of the CVBR encoder 700 is allowed to vary, but not exceed a maximum constraint defined by the maximum rate $C_m$ of the transmit processor 706 for a particular video stream pipe. FIG. 9 illustrates the output of the plurality of CVBR encoders, or, alternatively, the output of the media servers 200 transmitting the CVBR-encoded signals. In this example, the CVBR encoders are encoding the same data that was encoded to form the VBR compressed data of FIG. 6. Comparing FIG. 6 to FIG. 9, in FIG. 9 the bit rate peaks within each ATM pipe are chopped off at the points at which they exceed the bit rate constraints $C_1, C_2, \ldots, C_N$ for each pipe. In this manner, the cumulative bandwidth of the CVBR signals will never exceed the maximum 6 MHz channel bandwidth.

Unlike conventional systems, the present invention does not waste bandwidth by transforming the standard VBR encoder output into a CBR signal. Instead, the present invention utilizes this formerly wasted bandwidth to transmit other data. Application programs, application data and control information are not as sensitive as video data to transmission delays and dropped packets. Therefore, such data can be transmitted in the bandwidth represented by the space between the bit rate trace of a video signal and its maximum constrained limit $C_m$. This is accomplished using the available bit rate (ABR) flow control logic 1000 illustrated in FIG. 10.

Figure 10:
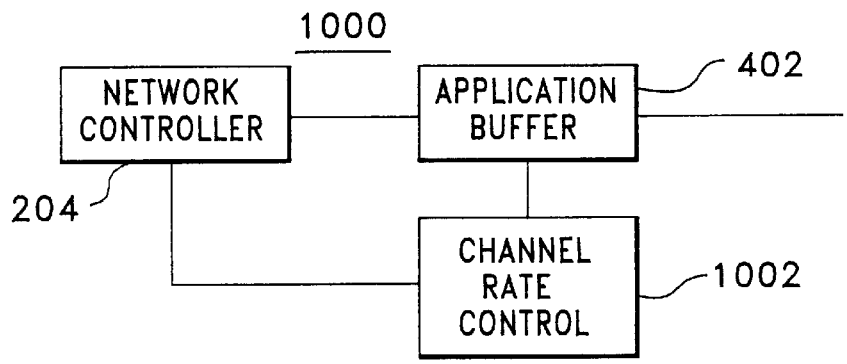
FIG. 10 illustrates flow control logic according to the present invention.
Figure 11:
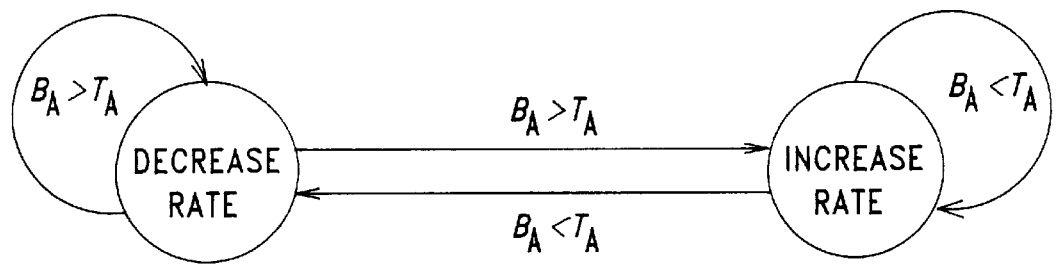
FIG. 11 is a state diagram illustrating the operation of the channel rate control circuit of the flow control logic of FIG. 10.

In FIG. 10, a channel rate control circuit 1002 controls the rate at which the network controller 204 forwards information to the application buffer 402 of the multiplexer 208. The channel rate control circuit 1002 operates according to the state diagram of FIG. 11. Recall that the selector 404 removes information from the application buffer 402 only when all the video buffers 400 are empty. When the application buffer 402 itself is relatively empty, as indicated by the application buffer fullness $B_A$ being less than a predetermined application buffer threshold value $T_A$ ($B_A<T_A$) the channel rate control circuit 1002 will increase the output rate of the network controller 204. If the application buffer 402 remains relatively empty, as indicated by $B_A<T_A$, then the channel rate control circuit 1002 will cause the network controller 204 rate to continue increasing, until the application buffer 402 becomes relatively full, as indicated by $B_A>T_A$. At that point, the network controller rate will be decreased, and will continue to decrease as long as the buffer 402 remains relatively full. When the buffer 402 again becomes relatively empty, the network controller rate will again be increased. In this manner, the rate of the nonvideo data is controlled so as to fill available bandwidth in the 6 MHz multiplexed channel.

Where the transport layer of the network implements the Transmission Control Protocol (TCP), the network controller 204 itself will control the output rate of application packets based upon changing conditions in the network. When a connection is established between the sender (the application server 202) and the receiver at the other end of the network, a transmit window size is agreed upon for transmission in each direction. The window size specifies the quantity of data that the sender may transmit before receiving an acknowledgment (ACK). Based upon the volume of traffic over the network, the window size can be adjusted, thereby controlling the rate of transmission of the application packets. Applied here, the network controller 204 adjusts output rate based upon the ability of the application server 202 to access the network (as reflected by received ACK messages) in light of competing traffic from the media servers 200. This TCP flow control method may be used alone or in combination with the buffer-fullness control provided by the channel rate control circuit 1002. Further discussion of TCP flow control may be found in J. Martin, *Local Area Networks,* Prentice Hall, 1994, pp. 459–62.

While the invention has been described with reference to numerous specific details, one of ordinary skill in the art will recognize that the invention can be embodied in other specific forms without departing from the spirit of the invention. In particular, those skilled in the art will recognize that the invention is not limited to the embodiments described herein. For example, the present invention applies to the multiplexing of any type of information, not just video, onto a channel, and is not limited to interactive networks. Thus, one of ordinary skill in the art would understand that the invention is not to be limited by the foregoing illustrative details, but rather is to be defined by the appended claims.

What is claimed is:

1. A method for communicating information onto a channel, the method comprising the steps of:
receiving at least one encoded information stream having a variable bit rate that is varied by external control other than the variations that can inherently occur in the information stream due to time-varying data and placing the encoded information stream into a buffer; and
controlling the rate of transmission of the at least one encoded information stream based on the degree of fullness of the buffer so that the variable bit rate of the at least one encoded information stream is transformed into a constrained variable bit rate.

2. The method of claim 1, comprising the step of multiplexing the at least one encoded information stream for transmission over the channel.

3. The method of claim 2, wherein the at least one encoded information stream is multiplexed onto a 6 MHz television channel.

4. The method of claim 2, further comprising the step of:
multiplexing the at least one encoded information stream with a secondary information stream for transmission over the channel, wherein the secondary information stream is selected for multiplexing with a lower priority than the at least one encoded information stream.

5. The method of claim 4, wherein the at least one encoded information stream comprises a plurality of encoded information streams, and the encoded information streams are selected for multiplexing from among each other according to a round robin scheme.

6. The method of claim 4, wherein the rate of the secondary information stream being multiplexed depends upon the rate of the at least one encoded information stream.

7. The method of claim 6, wherein the rate of the secondary information stream is controlled by a transmission control protocol, and the rate is adjusted by adjusting a transmit window of the protocol.

8. The method of claim 1, wherein at least one encoded information stream contains video data.

9. The method of claim 4, wherein the secondary information stream contains application data.

10. An apparatus for communicating information onto a channel, the apparatus comprising:
a buffer receptive of at least one encoded information stream having a variable bit rate that is varied by external control other than the variations that can inherently occur in the information stream due to time-varying data; and
a controller that controls the rate of transmission of the at least one encoded information stream based on the degree of fullness of the buffer so that the variable rate of the at least one encoded information stream is transformed into a constrained variable bit rate.

11. The apparatus of claim 10, further comprising a multiplexer for multiplexing the at least one encoded information stream for transmission over the channel.

12. The apparatus of claim 11, wherein the channel is a 6 MHz television channel.

13. The apparatus of claim 11, wherein the multiplexer multiplexes the at least one encoded information stream with a secondary information stream for transmission over the channel, and the multiplexer selects the secondary information stream for multiplexing with a lower priority than the at least one encoded information stream.

14. The apparatus of claim 13, the at least one encoded information stream comprising a plurality of encoded information streams, wherein the multiplexer selects from among the encoded information streams according to a round robin scheme.

15. The apparatus of claim 13, further comprising means for controlling the rate of the secondary information stream based upon the rate of the at least one encoded information stream.

16. The apparatus of claim 15, the means for controlling the rate of the secondary information stream operating according to a transmission control protocol, wherein the rate is adjusted by adjusting a transmit window of the protocol.

17. The apparatus of claim 10, wherein the at least one encoded information stream contains video data.

18. The apparatus of claim 13, wherein the secondary information stream contains application data.

19. A constrained variable bit rate encoder device, comprising:
- a variable bit rate encoder receptive of video data, the variable bit rate encoder generating as an output compressed video data at a variable bit rate known as the encoder rate, the encoder rate being externally controllable;
- a buffer receptive of the compressed video data;
- a transmit processor that can access the compressed video data and transmit compressed video data at a variable rate known as the transmit rate, the transmit rate being externally controllable; and
- a channel rate controller that is in communication with each of the variable bit rate encoder, the buffer, and the transmit processor, wherein the controller monitors the degree to which the buffer is full, and in response thereto the controller controls the encoder rate of the variable bit rate encoder and the transmit rate of the transmit processor to govern the overall rate at which the constrained variable bit rate encoder device outputs data.

20. A constrained variable bit rate encoder device as defined in claim 19, wherein the controller compares the degree of fullness of the buffer to a predetermined threshold.

21. A constrained variable bit rate encoder device as defined in claim 20, wherein the controller starts with a predetermined initial value for the encoder and transmit rates and has two modes of operation, an adjust encoder rate mode and an adjust transmit rate mode.

22. A constrained variable bit rate encoder device as defined in claim 21, wherein the predetermined initial values for the encoder and transmit rates are the maximum possible rates, and wherein the adjust transmit rate mode is initially entered if the degree of fullness of the buffer is less than the predetermined threshold and the adjust encoder rate mode is initially entered if the degree of fullness of the buffer is greater than the predetermined threshold.

23. A constrained variable bit rate encoder device as defined in claim 22, wherein the controller transitions from the adjust encoder rate mode to the adjust transmit rate mode when the transmit rate is at its maximum possible value and the degree of fullness of the buffer is greater than the predetermined threshold, and the controller transitions from the adjust transmit rate mode to the adjust encoder rate mode when the encoder rate is at its maximum possible value and the degree of fullness of the buffer is less than the predetermined threshold.

24. A method of constraining the variable bit rate of a video data stream to optimize the quality of the video image represented by the video data stream while minimizing the inefficiency of utilizing a bit rate that is any greater than necessary to optimize the quality of the video image and while preventing the bit rate from being higher than a predetermined threshold, the method comprising:
- encoding the video data at a variable bit rate, the encoder rate;
- storing the encoded data in a buffer;
- transmitting the video data from the buffer at a variable rate, the transmit rate;
- monitoring the degree of fullness of the buffer;
- adjusting the encoder rate and the transmit rate in response to the degree of fullness of the buffer; and
- limiting the transmit rate to be less than or equal to a predetermined threshold.

* * * * *